Nov. 20, 1951 W. S. GLENN, JR 2,575,552

TILTABLE PLATFORM FOR INDUSTRIAL TRUCKS

Filed April 5, 1949 10 Sheets-Sheet 1

WILLIAM S. GLENN, JR.,
INVENTOR.

BY

Paul Eaton

ATTORNEY.

TILTABLE PLATFORM FOR INDUSTRIAL TRUCKS

Filed April 5, 1949 10 Sheets-Sheet 2

WILLIAM S. GLENN, JR,
INVENTOR.

BY [signature]

ATTORNEY.

Nov. 20, 1951 W. S. GLENN, JR 2,575,552

TILTABLE PLATFORM FOR INDUSTRIAL TRUCKS

Filed April 5, 1949 10 Sheets-Sheet 3

WILLIAM S. GLENN, JR.,
INVENTOR.

BY [signature]

ATTORNEY.

Nov. 20, 1951 W. S. GLENN, JR 2,575,552

TILTABLE PLATFORM FOR INDUSTRIAL TRUCKS

Filed April 5, 1949 10 Sheets-Sheet 4

INVENTOR:
WILLIAM S. GLENN, JR.

BY

[signature]

ATTORNEY.

Nov. 20, 1951 W. S. GLENN, JR 2,575,552

TILTABLE PLATFORM FOR INDUSTRIAL TRUCKS

Filed April 5, 1949 10 Sheets-Sheet 5

WILLIAM S. GLENN, JR,
INVENTOR.

BY Ralph Eaton

ATTORNEY.

Nov. 20, 1951 W. S. GLENN, JR 2,575,552

TILTABLE PLATFORM FOR INDUSTRIAL TRUCKS

Filed April 5, 1949 10 Sheets-Sheet 6

WILLIAM S. GLENN, JR., INVENTOR.

BY [signature]

ATTORNEY.

TILTABLE PLATFORM FOR INDUSTRIAL TRUCKS

Filed April 5, 1949 10 Sheets-Sheet 7

INVENTOR.
WILLIAM S. GLENN, JR.,

BY

ATTORNEY.

Nov. 20, 1951 W. S. GLENN, JR 2,575,552

TILTABLE PLATFORM FOR INDUSTRIAL TRUCKS

Filed April 5, 1949 10 Sheets-Sheet 8

WILLIAM S. GLENN, JR.,
INVENTOR.

BY [signature]

ATTORNEY.

TILTABLE PLATFORM FOR INDUSTRIAL TRUCKS

Filed April 5, 1949

INVENTOR:
WILLIAM S. GLENN, JR.
BY
[signature]
ATTORNEY.

Nov. 20, 1951 W. S. GLENN, JR 2,575,552

TILTABLE PLATFORM FOR INDUSTRIAL TRUCKS

Filed April 5, 1949 10 Sheets-Sheet 10

WILLIAM S. GLENN, JR.,
INVENTOR.

BY Paul Eaton

ATTORNEY.

Patented Nov. 20, 1951 2,575,552

UNITED STATES PATENT OFFICE 2,575,552

TILTABLE PLATFORM FOR INDUSTRIAL TRUCKS

William S. Glenn, Jr., Spartanburg, S. C.

Application April 5, 1949, Serial No. 85,693

13 Claims. (Cl. 214—121)

This invention relates to industrial trucks, and more especially to attachments therefor for receiving and raising a load upon a carriage and for tilting the carriage to any desired position to facilitate the depositing of the load in any desired position and location to one side of the longitudinal axis of the truck.

The primary object of this invention is to provide a carriage platform having means for attaching the same to an industrial truck of a type having a relatively short wheel base with a power unit at one end and a load handling mechanism at the opposite end. The load handling mechanism usually comprises a vertically extending upright of a telescopic type having a pair of load engaging lift arms mounted for vertical movement on the upright. The upright is usually pivoted adjacent its lower end to enable the lift arms to be tilted forwardly and rearwardly.

The platform of the present invention is oscillatably connected to one of the load engaging lift arms mounted on the upright and hydraulic means are provided for pivoting the carriage platform on one of the load engaging lift arms so the carriage platform of the present invention may be moved from a horizontal to a vertical position, as desired, for depositing the load on the platform to one side of the path of travel of the industrial truck.

It is another object of this invention to provide, in combination with an industrial truck of the type described, said industrial truck having a vertically movable frame attached thereto, a pair of hydraulically operated squeeze arms projecting forwardly from the vertically movable frame, said arms being movable inwardly and outwardly with respect to each other. A substantially rectangular platform is provided having a tubular member secured to its lower surface and disposed near one end thereof. The tubular member extends forwardly and rearwardly with respect to the industrial truck and a second tubular member is removably secured to the lower surface of the platform near its other end and in spaced parallel relation to the other tubular member. A tie rod is connected to the removable tubular member at one end thereof and is connected at its other end to a plate projecting downwardly from the lower surface of the platform and being disposed on the opposite side of the first of the tubular members relative to the second tubular member, whereby, the squeeze arms may be slid into both of the tubular members and the second of the tubular members may be secured to one of the arms while the other of the tubular members may oscillate on the other of the squeeze arms and whereby, upon the hydraulically movable arms being moved apart from each other, the platform will be tilted about one of the arms by virtue of the tie rod pulling one end of the platform downwardly as the distance between the movable arms increases, thus raising the other end of the platform.

It is another object of this invention to provide a platform of the type described having means for tilting the platform around the axis of one of the hydraulically movable arms and to provide a member or plate at the end of the platform remote from the pivoted end of the platform and projecting upwardly therefrom when the platform is in lowered position, and to the upper end of which the lower end of a second plate is hingedly secured and to provide hydraulically operated means which is connected to the upper plate for pivoting the upper plate relative to the lower plate. The upper plate also has a pair of arms extending inwardly therefrom towards the other end of the platform, normally in parallel relation thereto, one of the arms being movable forwardly and rearwardly relative to the industrial truck and being connected to a movable piston rod which extends from a hydraulic cylinder fixed to the upper or hinged plate.

Thus, the upper plate may be pivoted out of the way of any load that may be placed on the platform prior to its being raised and then the upper plate may be moved to its normal position parallel to the lower plate so that the arms extending from the upper plate may straddle the load on the platform and the movable arm may be moved towards the fixed arm for clamping the load therebetween so that, as the platform is tilted about one of the hydraulically movable and forwardly projecting arms, the load will be held between the said arms projecting from the upper plate until the load is positioned to one side of the path of travel of the truck, after which the pressure of the arms on the load may be released and the entire platform moved away from engagement with the load.

It is a further object of the invention to provide a new and improved industrial truck arrangement having a load handling mechanism mounted on one end thereof which includes a load elevating platform and means for changing the atttitude of the platform from horizontal to vertical and vice versa and other means on the elevating platform adapted to clampingly engage the load to be carried by the elevating platform when the platform is moved to a vertical position to prevent the load from slipping off the platform, and until the load is properly positioned for releasing the same from the clamping means.

It is still another object of this invention to provide a load carrying attachment for industrial trucks comprising a tiltable platform having grasping means thereon whereby the industrial truck may move along relatively narrow aisles formed by rows of tiered objects and, without the necessity of turning the truck at an angle relative to its normal path of travel, the platform may be tilted to permit the grasping means to engage and grasp an object disposed in off-set relation to the normal path of travel of the industrial truck and then upon tilting the platform from a vertical to a horizontal position, the object will be moved, with the platform, into a position in line with the normal path of travel of the industrial truck thus permitting removal of the said object from its row without the necessity of positioning the industrial truck at an angle and without the necessity of removing objects disposed either side of the selected object, which will thus permit the storing of objects in relatively narrower rows than has heretofore been practicable to thus greatly increase the storage capacity of a given area, such as the floor of a cotton warehouse.

Some of the objects of the invention having been stated, other objects will appear as the description proceeds, when taken in connection with the accompanying drawings, in which Figure 1 is a side elevation of an industrial truck and showing one form of the invention applied thereto;

Figure 1:
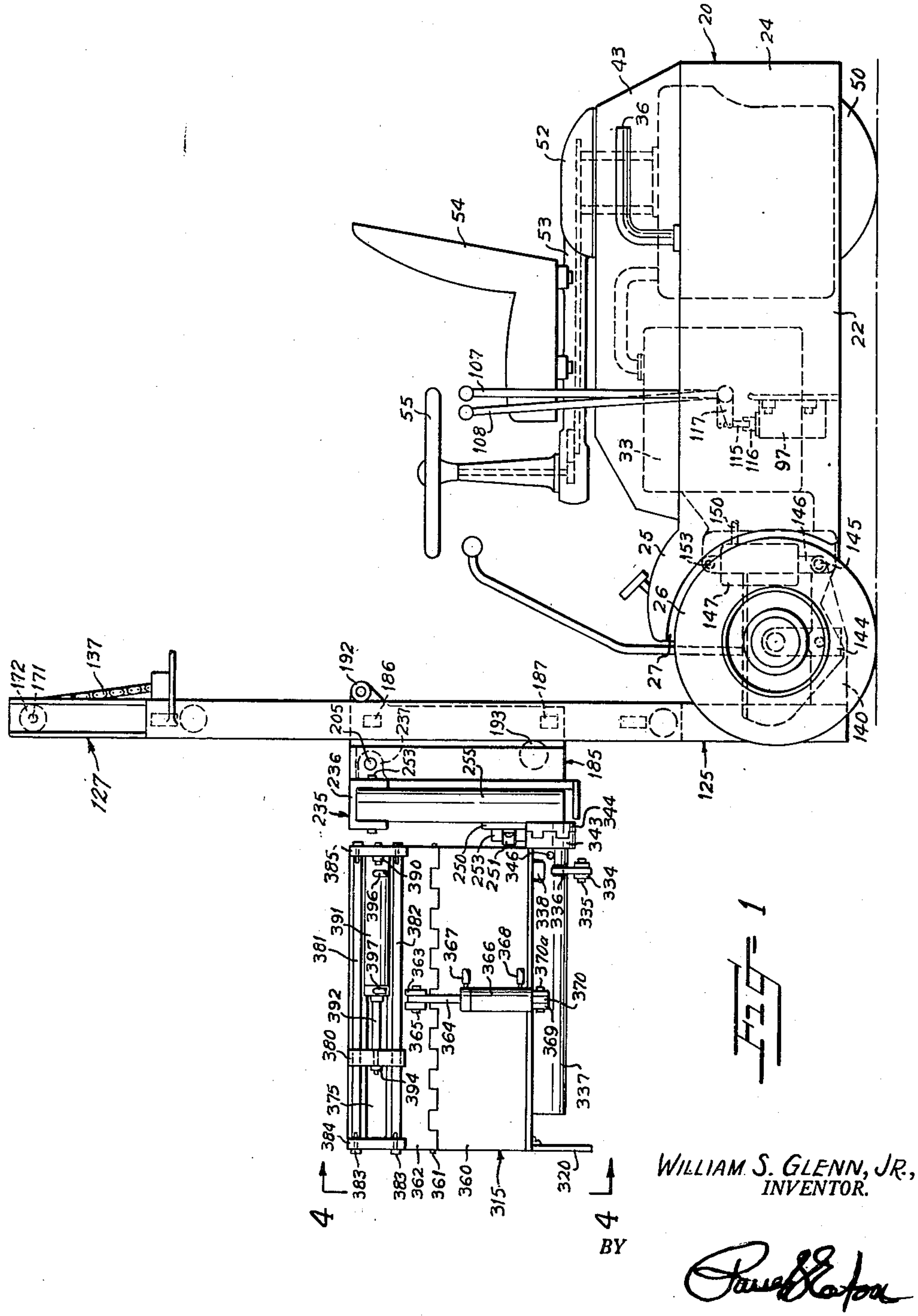

Referring more specifically to the drawings, the numeral 20 broadly designates an industrial truck such as is shown in U. S. patents numbered 2,287,007 and 2,428,223 issued to D. V. Johnson. The chassis of the lift truck generally comprises a pair of side panels 22 joined at the top under the feet of an operator by a transversely extending frame member 23 which also serves as a floor board and joined at the rear by a vertically extending partially cylindrical end wall 24. At the forward end of the vehicle each of the side panels 22 is provided with a transversely extending partially cylindrical curved wall 25 which is spaced slightly apart from each of the front wheels 26 to form a fender, and the wall 25 is joined to a forwardly extending supporting flange 27 (Figures 1 and 5) which is secured to a front axle housing 28.

Figure 5:
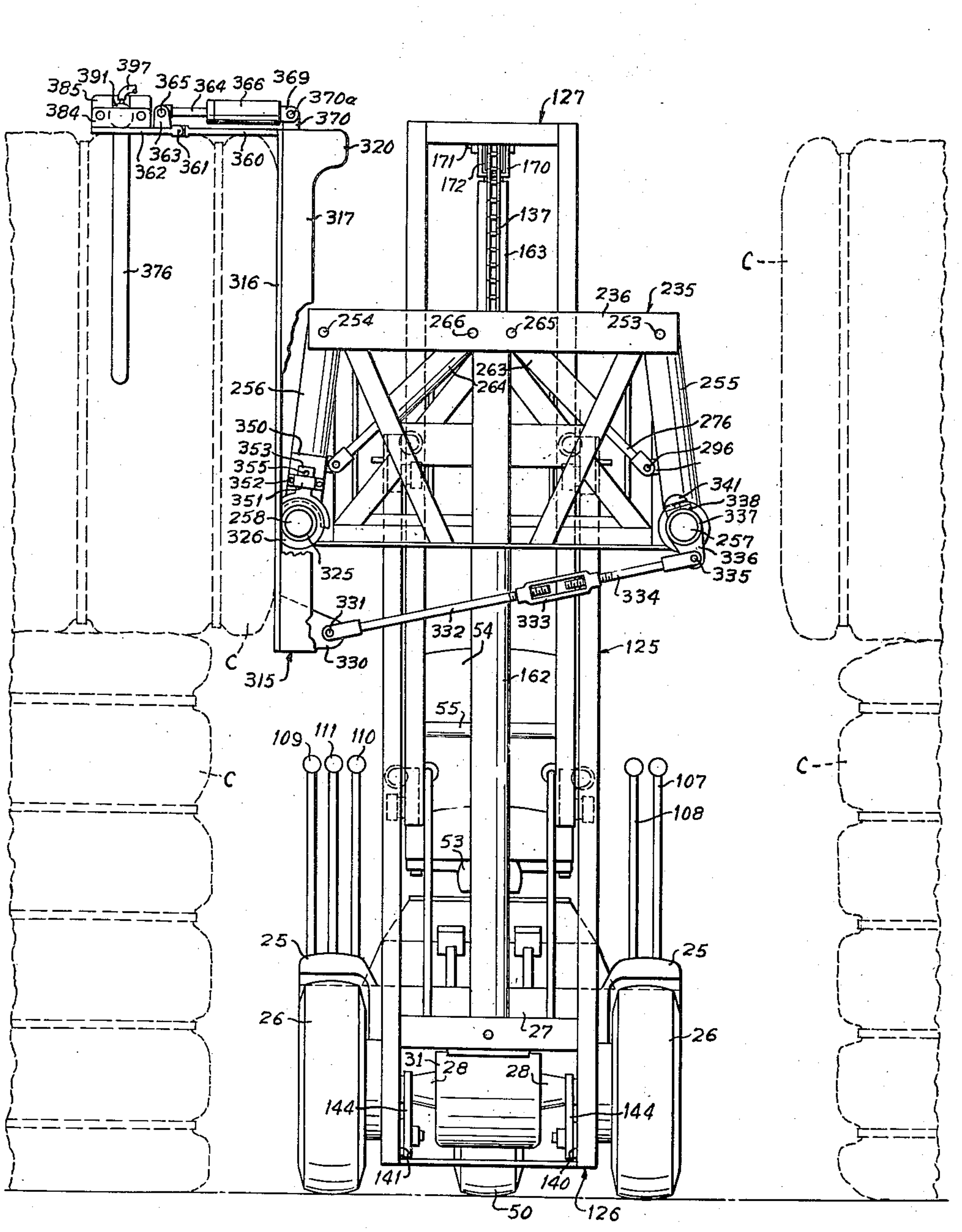
Figure 5 is a front elevation looking from the left-hand side of Figure 1 to the right and showing the industrial truck having the swinging arm attachment thereon and showing the improved carriage platform in a different position from that in which it is shown in Figure 1 and also showing articles, such as bales of cotton, in dotted lines stacked on both sides of the industrial truck.

The front wheels 26 are mounted on conventional axles, not shown, within the axle housing 28 and which are driven by conventional gearing disposed within a transmission housing 31 (Figure 5). The reference character 33 indicates diagrammatically in Figure 1 the power unit which is connected to the transmission housing 31. The chassis also has a rear steerable wheel 50.

The chassis supports at its rear top a circular member 52 (Figures 1 and 2) which supports a forwardly extending arm 53 which houses the steering mechanism and carries a seat 54 for the driver or operator of the vehicle and supports at its forward end a steering wheel 55 which directs the steerable wheel 50.

Figures 2, 3:
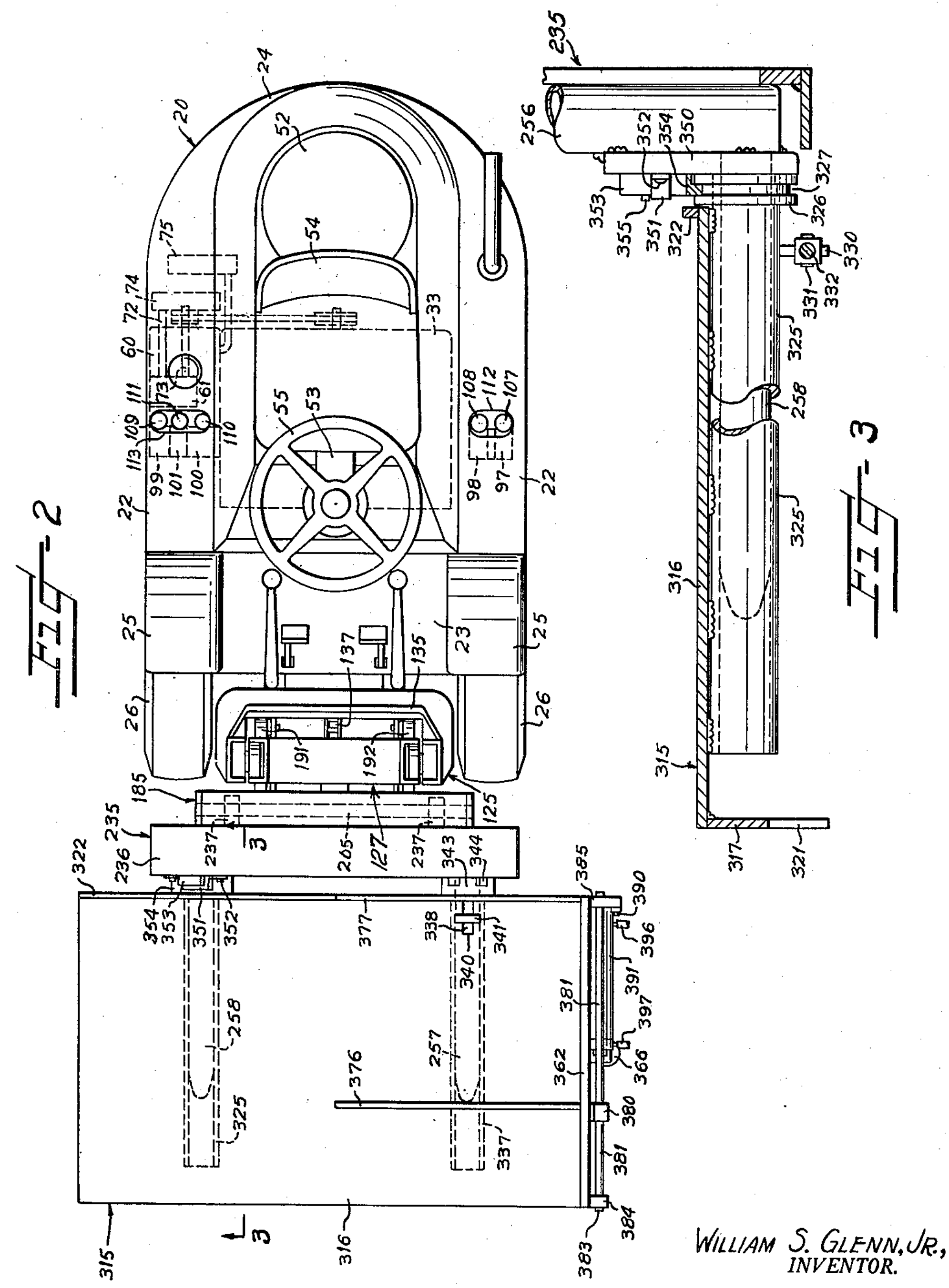
Figure 2 is a top plan view of the structure shown in Figure 1.
Figure 3 is an enlarged elevation with parts in section and is taken along the line 3—3 in Figure 2 and shows the manner in which the improved carriage platform is connected to one of the hydraulically operable swingable squeeze arms.

The numeral 60 indicates diagrammatically in Figure 2 a reservoir or expansion tank which is supported by the chassis of the truck 20. This expansion tank 60 is also shown schematically in Figure 7 and has a suitable hydraulic gear pump 61 mounted therein which is driven by the power unit 33 in a conventional manner. The expansion tank 60 in Figure 7 has a suitable hydraulic fluid 70 therein in which one end of an intake pipe 71 is submerged, the other end of the pipe leading to the hydraulic pump 61.

Figure 7:
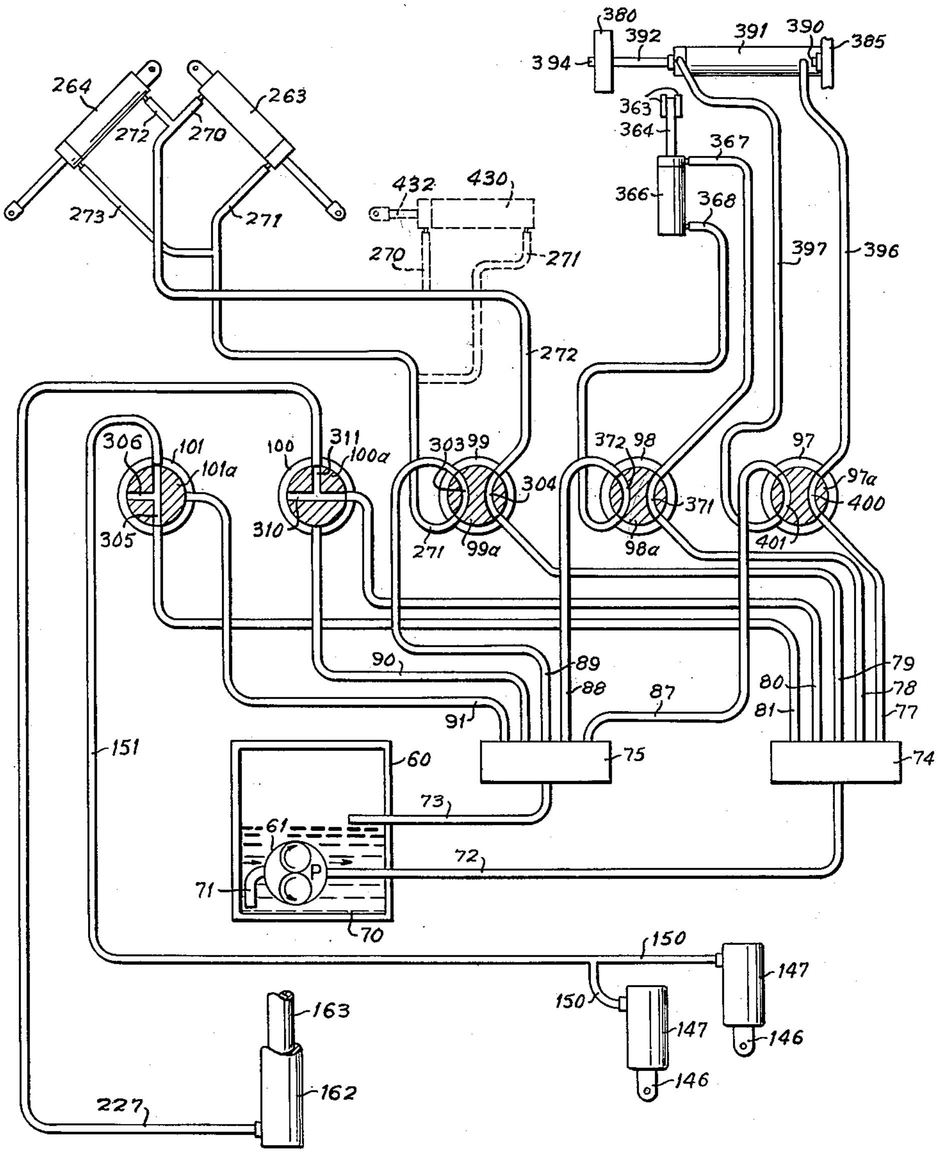
Figure 7 is a schematic diagram showing the hydraulic system used in conjunction with this apparatus.

The expansion tank 60 also has a discharge pipe 72 extending from the same which also extends from the pump 61 and a return pipe 73 also extends from the tank 60. The pipes 72 and 73 are connected at their other ends to manifolds 74 and 75, respectively (Figures 2 and 7). Referring to Figure 7 it may be observed that the manifold 74 has supply pipes 77 to 81 inclusive extending therefrom, and the manifold 75 has return pipes 87 to 91, inclusive, extending therefrom. The pipes 77 to 81, inclusive, and 87 to 91, inclusive, are omitted from Figures 1, 2 and 5 for purposes of clarity, inasmuch as they would have to be shown in dotted lines and would merely lend to confusion.

The other ends of the pipes 77 to 81, inclusive, are connected to valves 97 to 101, inclusive, respectively, which have rotatable cores 97*a* to 101*a*, respectively, therein, each having two passageways therein, to be later described. The other ends of the pipes 87 to 91, inclusive, are also connected to the valves 97 to 101, inclusive, respectively, as shown in Figure 7. The valves 97 to 101, inclusive, are to be later described and these valves are also shown in Figure 2 diagrammatically.

The valves 97 to 101, inclusive, have control levers 107 to 111, inclusive, respectively, extending upwardly therefrom, there being suitable openings 112 and 113 in the upper horizontal portions of the side panel 22 which are loosely penetrated by the control levers 107 to 111, inclusive. It will be noted that these control levers are positioned closely adjacent the seat 54 so that they may be easily accessible to the operator of the industrial truck.

Although the valves 97 to 101, inclusive, are shown in Figure 7 as being rotary valves, this showing is made merely by way of illustration so as to clearly define the manner in which the various cylinders and their pistons are operated. There is shown in Figure 1 a suitable link 115 which is adapted to be connected to a plunger 116, each of the valves 97 to 101 being identical but only the valve 97 being shown in Figure 1. This link 115 has pivotally connected thereto at its upper end a bell crank arm 117 and thus by moving the levers 107 to 111, inclusive, forwardly and rearwardly, the valve members 97 to 101 are opened and closed. The valves 97 to 101 are suitably secured to the chassis of the truck 20.

The control levers 110 and 111 and their associated valves 100 and 101, along with the expansion tank and the pump 61 are a usual part of industrial trucks of this type, as is clearly shown in the said Patent Number 2,428,223 and a further description of the hydraulic system associated with this truck and with the present invention will be given later in this specification.

Referring to Figures 1, 2 and 5, the front of the vehicle is provided with an extensible telescopic elevator frame provided with a load carrying carriage, this assembly being broadly designated by the reference character 125.

The elevator frame comprises a pair of vertical frame sections mounted to telescope with respect to each other, the lower frame section being indicated at 126 and the upper frame section or extensible frame being indicated by the reference character 127. The extensible frame section 127 is mounted for up and down movement within the lower frame section 126. The upper portion of the lower frame 126 serves as an anchor for one end of a sprocket chain 137 suitably secured thereto.

At its lower end the vertical frame 126 is usually provided with a pair of rearwardly extending arms 140 and 141, one of which is seen in Figure 1 and both of which may be observed in Figure 5. Each of these bars 140 and 141 may be pivotally mounted on a hanger 144 (Figure 1) supported from the front axle housing 28 so the load supporting assembly 125 is carried by the front axle housing and is mounted for pivotal movement either on the axle housing or the hanger 144. The rearmost end of each of the arms 140 and 141 is pivotally connected as at 145 to the free lower end of the piston rod 146 of a piston which is mounted for vertical reciprocation in a cylinder 147 (Figure 1). Only one of the cylinders and its associated piston 146 is shown in Figure 1, but both of the pistons and the cylinders 146 and 147 are shown in the schematic diagram in Figure 7. Each of the cylinders 147 has a pipe 150 extending therefrom (Figure 7) which are coupled together thus forming a single pipe 151 which extends to one side of the control valve 101.

The cylinder 147 is pivotally mounted on the chassis as at 153 (Figure 1) as is clearly shown in the said Patent Number 2,428,223. The cylinder 147 has a hydraulic piston, not shown, which is actuated by hydraulic fluid under pressure, as will be later described in detail, to effect a tilting of the frame 125 backward or forward at its upper end to facilitate loading and unloading of the platform carriage to be later described.

The frame 125 is moved in a clockwise direction in Figure 1 by the piston 146 and is moved in a counterclockwise direction by gravity, since it is pivotally mounted at 143 to the right of its center of gravity. Industrial trucks of this type are also usually provided with means to assure the return of the tilting assembly to a vertical position when it has been tilted forwardly and to assure the emptying of the hydraulic fluid from the cylinders 147 when hydraulic pressure is removed, all of which is clearly shown in said Patent Number 2,428,223. A piston 163 is mounted for vertical sliding movement in a cylinder 162 for actuating or lifting the upper frame section 127. The cylinder 162 is supported by the lower frame section 126.

The upper end of the piston 163 (Figure 5) engages the lower end of a U-shaped bracket 170 having a belt 171 penetrating the same on which a suitable pulley 172 is rotatably mounted. The upper end of the U-shaped member is welded to the extensible frame section 127.

Figures 6, 16:
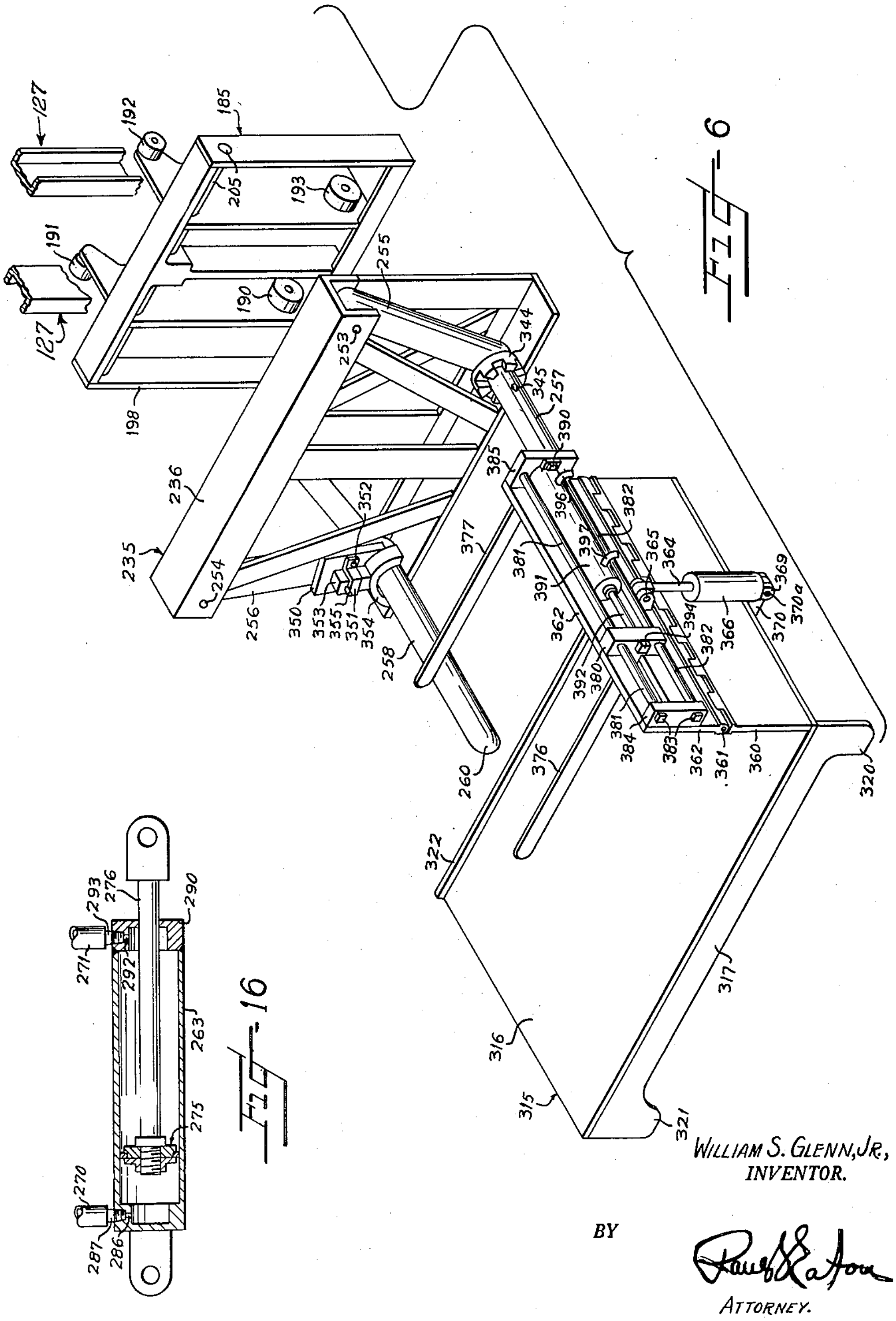
Figure 6 is an exploded isometric view showing a portion of the telescopic uprights, the vertically movable frame, the swingable arm unit and the improved carriage platform with some of the parts omitted for purposes of clarity.
Figure 16 is a longitudinal sectional view through a typical double-acting cylinder and is taken substantially along the line 16—16 in Figure 4, but is shown as though rotated 90° on its axis.

The upper movable frame section 127 supports a vertically movable substantially rectangular framework broadly designated at 185 (Figure 6). This rectangular frame 185 is guided on the upper movable frame 127 by a plurality of rollers 186 to 193, inclusive, the rollers 186 to 189 inclusive not being visible in Figure 6, but all of the rollers being shown in Figure 10.

The rollers 186 to 193 engage the vertically movable frame 127 so as to guide the rectangular frame 185 in a plane parallel to the vertical frame 127 and to prevent tilting of the rectangular frame 185 independently of the vertically movable frame 127.

The modified form of the invention shown in Figures 10 to 14, inclusive, is mounted on lift arms which are usual parts of industrial trucks of this type and which are also shown in the said Patent Number 2,428,223. These arms, which are designated at 216 and 217, are pivotally mounted at their upper ends on a horizontally disposed shaft 205 carried by the rectangular framework 185 and are provided with horizontally disposed portions 220 and 221 respectively, extending therefrom. These portions 220 and 221 are usually tapered toward their outer ends on their lower sides, so that the tapered sides may extend parallel to the floor or ground when the frames 126 and 127 are tilted forwardly to take on a load.

The chain 137, which has heretofore been described as being secured to the upper end of the lower frame 126 (Figures 1 and 2), passes over the pulley 172 mounted in the upper end of the extensible frame 127 and passes down parallel to the piston 163 and the cylinder 162 and has its other end suitably anchored to the upper end of the rectangular frame 185.

It should be noted that when the piston 163 is forced upwardly by hydraulic fluid under pressure in the cylinder 162, it engages the movable frame section 127 (Figure 5) and lifts the upper frame section 127 as well as the pulley 172. Since the rear end of the chain 137 is anchored to the lower frame section 126, the raising of the pulley extends both the forward and rearward bight or reach of the chain 137 and the rectangular frame 185 is raised twice as fast as the upper or vertically movable frame section 127.

Since the piston 163 and cylinder 162 perform as a single acting cylinder and the piston 163 is returned in the cylinder 162 by gravity, there is but a single pipe 227 which extends from the lower end of the cylinder 162 and is connected at its other end to the valve mechanism 100 and the function of the valve 100 will be later described.

Figure 10:
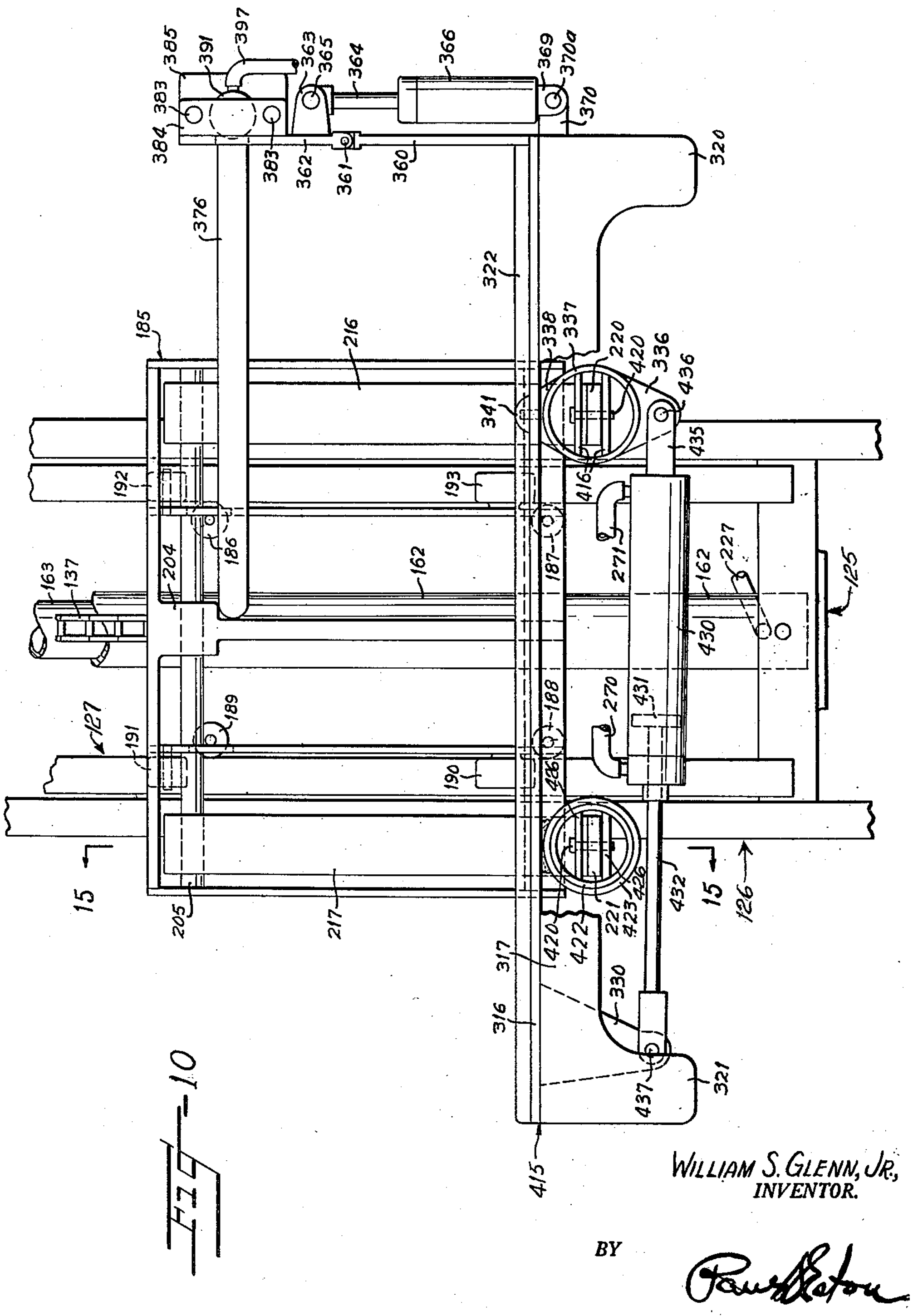
Figure 10 is a view similar to Figure 4 but showing a modified form of the invention with parts broken away for purposes of clarity.
Figure 15:
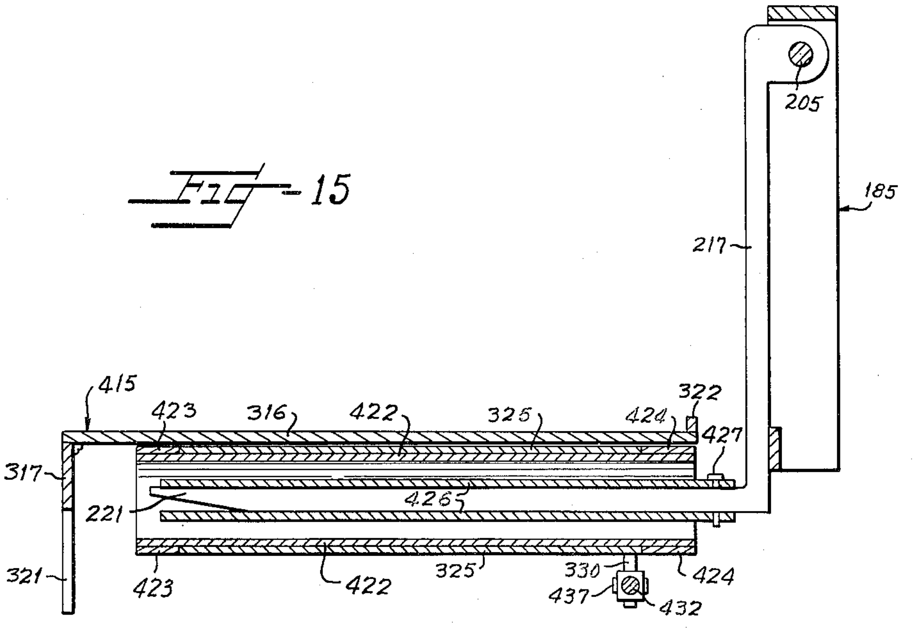
Figure 15 is a vertical sectional view taken along the line 15—15 in Figure 10 but showing the lift arm in elevation.

This completes the description of the lift truck and its usual attachments for raising and lowering objects as they are carried from one place to another; however, in the original form of the invention, the lift arms 216 and 217 as shown in Figures 10 and 15 are removed from the shaft 205 in the rectangular framework 185 and an auxiliary frame 235, which usually supports hydraulically actuated swingable squeeze arms is mounted on the rectangular frame 185, in a manner to be later described.

It is to be understood that the structure of the auxiliary frame 235 with its hydraulically actuated arms is not considered a part of the present invention with the exception of its combination with the present invention. However, a substantial description of the same follows since there are no known existing patents to which reference may be made for a complete description of the same.

Referring to Figures 1, 2, 4, 5 and 6, it may be observed that the arms 216 and 217 shown in Figure 10 are removed from the horizontally disposed shaft 205 and an inverted horizontally disposed channel bar 236 of the auxiliary frame 235 bears against the front surface of the rectangular frame 185 and has a pair of spaced ears or bosses 237 thereon which are adapted to be slidably penetrated by the shaft 205 to thus connect the channel bar 236 to the rectangular frame 185. There are various ways in which the auxiliary frame 235 may be secured to the rectangular frame 185, the methods shown being by way of illustration only.

Pivotally connected between the flanges of the channel bar 236, as at 253 and 254, are depending swingable arms 255 and 256, respectively. These arms 255 and 256 are shown as being circular in cross section and have forwardly extending gripper or squeeze arms 257 and 258, respectively, secured thereto as by welding. The squeeze arms 257 and 258 are also preferably circular in cross section and are rounded at their front ends at 260 (Figure 6). The rounded front ends 260 of the squeeze arms 257 and 258 are provided to assist in guiding the members 257 and 258 as they are moved into tubular members, to be later described, associated with the improved carriage platform.

Figure 4:
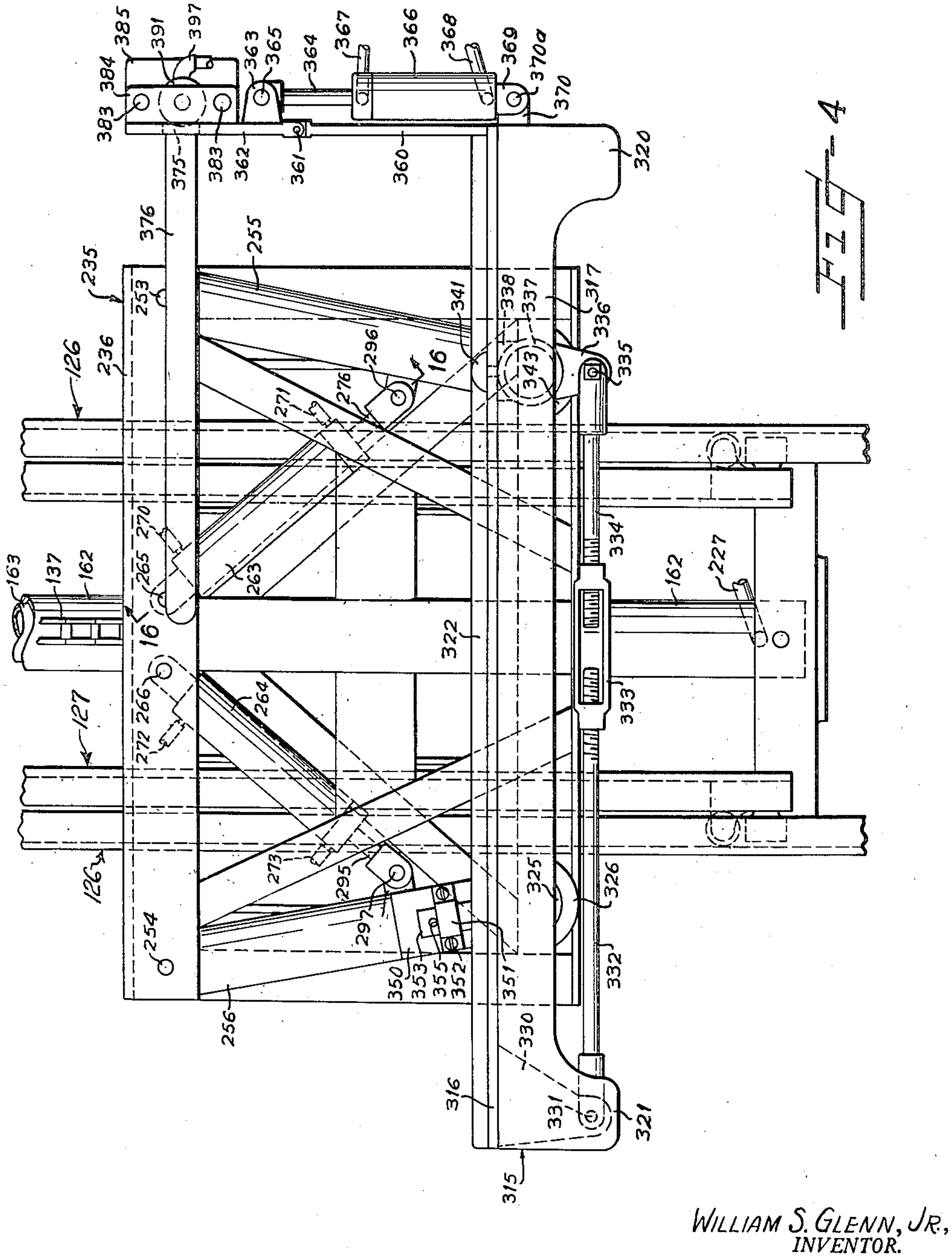
Figure 4 is an enlarged front elevation showing the carriage platform mounted on the swingable squeeze arm and is taken looking along the line 4—4 in Figure 1.

Referring to Figures 4 and 5, it may be observed that the upper ends of cylinders 263 and 264 of the double acting type are pivotally connected as at 265 and 266, respectively, to the flanges of the horizontally disposed channel bar 236. The cylinder 263 has flexible pipes or hose 270 and 271 extending therefrom and the cylinder 264 has flexible pipes or hose 273 and 272 extending therefrom.

It will be noted in Figure 7 that the flexible pipes 272 and 273 are connected to the flexible pipes 270 and 271 and these pipes 270 and 271, in turn, extend to separate ports in the valve 99.

The structure of the double acting cylinders 263 and 264 as well as any other double acting cylinders associated with this apparatus may be identical and therefore only the structure of the cylinder 263 will be described. Referring to Figure 16, it may be observed that the cylinder 263 has a suitable piston broadly designated at 275 mounted therein for longitudinal sliding movement. This piston 275 may be of any desired structure and has a piston rod 276 connected thereto.

The cylinder 263 is provided with a port 286 at one end which is threaded for reception of a suitable pipe fitting 287 to one end of which one end of the pipe 270 is connected.

Secured, as by welding to the right-hand end of the cylinder 263 in Figure 16 is a cap member 290 having a port 291 which is threaded for reception of the pipe fitting 293, to the outer end of which the pipe 271 is suitably connected.

Referring again to Figure 4, the cylinder 264 has a piston rod 295 extending therefrom which is identical to the piston rod 276 extending from the cylinder 263. The piston rods 276 and 295 are pivotally connected at their free ends, as at 296 and 297, to the proximate sides of the pivoted arms 255 and 256.

This completes the description of the squeeze arm attachment, comprising the auxiliary frame 235 and its squeeze arms 257 and 258, as it is usually used and in which instance the arms 257 and 258 straddle the object, which is usually a resilient object, such as a bale of cotton. The squeeze arms are moved inwardly by moving the upper end of the control lever 109 in Figure 2 rearwardly so as to cause the fluid under pressure to flow from the pump 61 through pipe 72, valve 74 and pipe 79 through a passageway 303 in the core 99*a* of the valve 99, since this valve core 99*a* has been rotated a quarter revolution from the position shown in Figure 7, and thus through the pipes 271 and 273 to the lower ends of the cylinders 263 and 264 to thus cause the piston rods 276 and 295 to be drawn into the cylinders 263 and 264, in which instance the fluid would return through the pipes 270 and 272 and through a passageway 304 in the valve 99 and through pipe 89 to the manifold 75 and then through the return pipe 73 into the expansion tank 60. The valve 99, of course, would be rotated 90 degrees from the position shown in Figure 7 during this period.

Now, when it is desired to release the object from between the squeeze arms 257 and 258, the control lever 109 is moved forwardly at its upper end to thus rotate the valve core 99*a* from its prior position to the position shown in Figure 7 to thus cause the fluid to flow to the upper ends of the cylinders 263 and 264. This will, of course, project the corresponding piston rods 276 and 295 outwardly to move the squeeze arms 257 and 258 apart from each other and the fluid will return from the lower ends of the cylinders 263 and 264 to the expansion tank 60.

Now, referring to Figure 7, and assuming that the operator desires to tilt the upper ends of the frames 126 and 127 backwardly or to the right in Figure 1, the lever 111 is moved rearwardly to thus position a core 101*a* of the valve 101 in the position shown in Figure 7 with the result that the fluid under pressure will flow from the pump 61 through pipe 72, manifold 74, and pipe 81 to the valve 101. The valve core 101*a* has a passageway 305 extending therethrough, through which fluid will pass into the pipe 151 and then into the pipes 150 to force the pistons 146 downwardly in Figures 1 and 7 to thus cause the frames 126 and 127 to move in a clockwise direction in Figure 1.

The core 101*a* of the valve 101 in Figure 7 also has a passageway 306 and when the lever 111 in Figure 2 is moved forwardly at its upper end, the core 101*a* in Figure 7 is rotated 90 degrees in a clockwise direction from the position shown in Figure 7. The weight of the frames 126 and 127 and associated parts will then cause the pistons 146 to move upwardly in the cylinders 147, resulting in the fluid returning through the pipes 150 and 151 to the valve 101. The fluid will then return to the expansion tank 60.

Now, assuming that the operator desires to raise the frame 127 and the associated rectangular frame 185 along with the framework 235 and its squeeze arms 257 and 258, the control lever 110 is moved rearwardly to thus position the core 100*a* of the valve 100 as shown in Figure 7. The fluid will then flow from the expansion tank 60 to the valve 100. The core 100*a* has a passageway 310 extending therethrough and another transverse passageway 311 communicating therewith and extending to the outside of the valve core 100*a* and fluid will then flow under pressure from the pipe 80 through the passageways 310 and 311, successively, and then through the pipe 227 to the lower end of the cylinder 162. This will, of course, cause the piston 163 to move upwardly to raise the frame 127 and the rectangular frame 185, in the manner heretofore described, after which the control lever 110 may be released and the core 100*a* will rotate about 45 degrees to thus move both of the passageways 310 and 311 out of alinement with the pipes 227, 90 and 80. Now, when it is desired to again lower the rectangular frame 185, the control lever 110 (Figure 2) is then moved forwardly at its upper free end to thus move the core 100*a* in the valve 100 (Figure 7) 90 degrees in a counterclockwise direction from that shown in Figure 7. This will, of course, aline the passageway 310 with the pipes 227 and 90, as a result of which the hydraulic fluid will return, due to the weight of the parts raised by the piston 163, to the expansion tank 60.

All of the above is not a part of my invention, but the same is shown and described in order to show how my invention is mounted on and cooperates with the above described parts.

*Improved carriage platform*

Figures 1 to 5, inclusive, show the structural details of the improved carriage platform which is broadly designated at 315. This carriage platform is adapted to be mounted on the squeeze arms 257 and 258 and may be easily removed therefrom when it is desired to use the squeeze arms 257 and 258 for other purposes as heretofore disclosed. The means for mounting the improved carriage platform 315 on the squeeze arms 257 and 258 will be later described.

The carriage platform 315 comprises a rectangular plate 316, which, for purposes of description, we will assume is in a horizontal position as shown in Figures 1, 2, 4 and 6, although it is to be understood that this plate 316 may be tilted to assume any desired attitude, as will be later described, from horizontal to vertical.

This plate 316 has extending along its front edge and projecting downwardly therefrom, and being welded thereto, a reinforcing plate 317 having leg portions 320 and 321 at opposite ends thereof for supporting the front end of the platform 315 when it is resting on the floor or ground independently of the squeeze arms 257 and 258. Welded to the top rear edge of the plate 316 is another reinforcing bar 322.

Referring to Figures 4 and 5 it may be observed that there is a tubular member, such as a pipe 325, welded to the lower surface of the plate 316. This pipe 325 is positioned a substantial distance from the left-hand end of the plate 316 as observed in Figure 4 and extends a short distance beyond the rear edge of the plate 316 and has an annular member 326 fixedly secured thereon as by a pressed fit or by welding.

The annular member 326 is provided with a peripheral groove 327 (Figure 3) for purposes to be later described.

Welded to the lower surface of the plate 316 adjacent its left-hand rear corner in Figure 4 is a depending plate 330 the lower end of which terminates in a horizontal plane slightly above that of the leg portion 321 of the reinforcing plate 317. Pivotally connected to the plate 330 as at 331 is one end of a connecting rod 332 which is threadably mounted at its other end in a turnbuckle 333. The other end of the turnbuckle 333 in Figure 4 has one end of a connecting rod 334 threadably mounted therein, the other end of which is pivotally connected as at 335 to an arm 336 extending downwardly from a tubular member or pipe 337 to which it is secured as by welding.

Referring to Figures 1 and 5, it may be observed that the pipe 337 has a block 338 welded to its upper surface in substantially vertical alinement with the arm 336 and the upper surface of this block 338 normally supports the plate 316. The plate 316 has a slot 340 therein which is loosely penetrated by the threaded portion of a thumb screw 341 when the plate 316 is locked in engagement with the pipe 337. When the thumb screw 341 is turned at right angles from the position shown in Figure 2, then the slot 340 permits the lower end of the plate 316 in Figure 2 to be moved away from the pipe 337 by means to be later described.

Referring to Figures 1 and 2 it may be observed that the right-hand end of the tubular member 337 has a dog clutch member 343 fixedly mounted thereon as by welding. Now, when the squeeze arms 257 and 258 are slid into the tubular members 325 and 337, the dog clutch member 343 is adapted to engage a fixed dog clutch member 344 welded to the pivoted arm 255 and the squeeze arm 257 to thus prevent rotation of the tubular member 337 on the squeeze arm 257. The squeeze arm 257 may be provided with a transverse bore 345 (Figure 6) adapted to be loosely penetrated by a pin 346

(Figure 1) to further assist in locking the member 337 on the squeeze arm 257 if desired.

When the squeeze arm 258 is inserted in the tubular member 325 the right-hand end of the tubular member 326 in Figure 3 will engage a plate 350 which is secured as by welding to the lower portion of the pivoted arm 256. This plate 350 extends upwardly from the squeeze arm 258, which also penetrates the same at its connection with the pivoted arm 256, and has a guide block 351 secured thereon as by screws 352.

The guide block 351 is slidably penetrated by an upwardly projecting arm 353 having a semicircular locking member 354 integral therewith and which is adapted to engage the peripheral groove 327 in the annular member 326 as shown in Figure 3 to thus prevent the member 325 from sliding off of the squeeze arm 258 unintentionally but still permitting rotation of the member 325 on the squeeze arm 258. The arm 353 has a pin 355 projecting therefrom which is adapted to engage the upper edge of the guide block 351 when the tubular member 325 and its associated plate 316 of the carriage platform 315 are removed from the squeeze arm 258.

Welded to the right-hand end of the plate 316 in Figure 4 and projecting upwardly therefrom is a vertically disposed end plate 360 which has hingedly connected to its upper end, as at 361, a swingable plate 362. The plates 360 and 362 extend forwardly and rearwardly from the front to the rear of the plate 316 and may be reinforced throughout their length in any desired manner. It will be noted in Figure 6 that the hinge portion 361 extends the full length of the members 360 and 362.

The plate 362 has a pair of ears 363 projecting outwardly therefrom between which the upper end of a piston rod 364 has oscillatory movement. The upper end of piston rod 364 is pivotally connected as at 365 to the ears 363. The piston rod 364 has vertical sliding movement in a double acting cylinder 366 which is identical with the double acting cylinder 263 heretofore described and a further description of the same is deemed unnecessary. This double acting cylinder 366 has flexible pipes or hose 367 and 368 extending therefrom and being connected at their other ends to separate ports in the valve 98 (Figure 7).

Figures 11, 12:
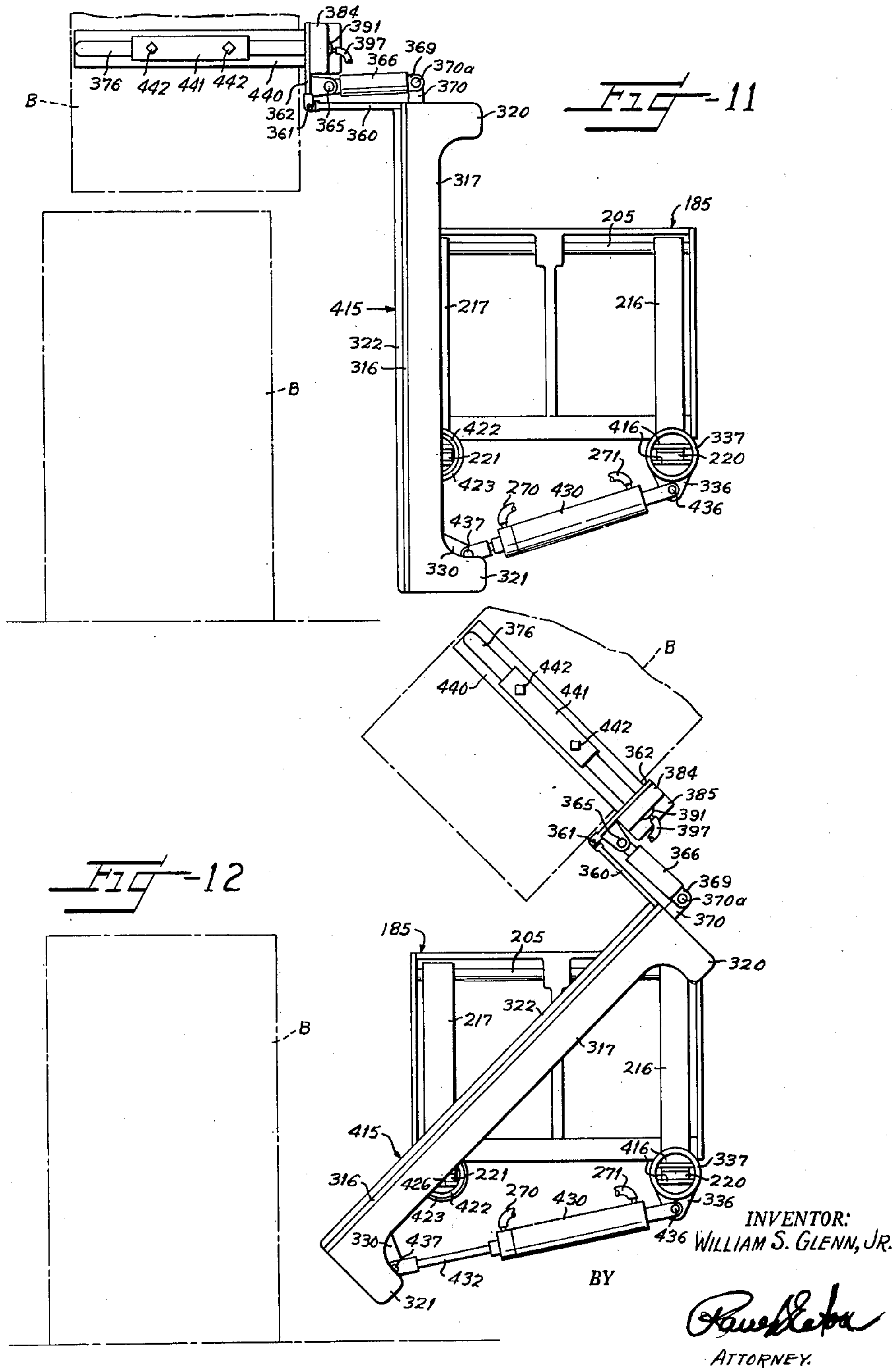
Figure 11 is a schematic showing of the modified form of the invention with an attachment thereon for handling and stacking cylindrical objects such as oil drums and the like and showing one of the oil drums being removed from the upper end of another oil drum.
Figure 12 is a schematic elevation similar to Figure 11 but showing the improved carriage platform in a different position.

It will be noted in Figure 7 that the valve 98 has the partially rotatable core 98*a* having curved passageways 371 and 372 therein which are positioned substantially as shown in Figure 7 when the control lever 108 is moved forwardly (Figures 1 and 2) and in which instance, the hydraulic fluid under pressure would flow from the hydraulic pump 61 through pipe 72, manifold 74 and pipe 78 to the valve 98. The fluid would then flow through the passageway 371 and pipe 367 to the upper end of the cylinder 366 to thus cause the piston rod 364 to move downwardly and to move the hinged plate 362 in a clockwise direction in Figure 4 substantially as shown in Figures 11 and 12. The plate 362 may be stopped in any desired attitude within 90 degrees of that in which it is shown in Figure 4 if desired by moving the control handle 108 to its normal vertical position. In this instance the core 98*a* in valve 98 (Figure 7) would be rotated approximately 45 degrees to where the passageways 371 and 372 would not be in alinement with any of the associated pipes.

On the other hand, when it is desired to return the plate 362 from the position shown in Figures 11 and 12 to that shown in Figure 4, the control lever 108 would be moved rearwardly to thus partially rotate the core 98*a* in Figure 7 to where the passageway 371 would connect pipes 78 and 368 and the passageway 372 would connect pipes 88 and 367. Thus, fluid under pressure would flow through the pipe 78, passageway 271 and pipe 368 to the lower end of the cylinder 366 to thus move the piston rod upwardly, the fluid returning through the pipe 367, the passageway 372 in the core 98*a* and the pipe 88 to manifold 75 from which the fluid would return to the expansion tank 60 through the pipe 73.

The hinged plate 362 has an elongated slot 375 therein which is adapted to be loosely penetrated by a forwardly and rearwardly movable squeeze arm 376 (Figures 1 and 4). This movable squeeze arm 376 is similar to a fixed squeeze arm 377 the lower end in Figure 2 of which is secured as by welding to the right-hand end of the hinged plate 362. The movable squeeze arm 376 has an enlarged guide block portion 380 integral therewith which is slidably penetrated by spaced guide rods 381 and 382 secured as by screws 383 (Figure 1) to blocks 384 and 385 welded to and projecting outwardly from the hinged plate 362.

It will be noted that the right-hand block 385 is substantially wider than the left-hand block 384 in Figures 1, 5 and 6 and has secured thereto, as by a bolt 390, one end of a double acting cylinder 391 which is identical to the double acting cylinder 263 heretofore described. The piston rod 392 of the cylinder 391 has a restricted threaded portion at its left-hand end in Figure 1 which slidably penetrates the block portion 380 of the movable squeeze arm 376 and this block portion 380 is secured thereon as by a nut 394. The cylinder 391 has pipes 396 and 397 extending from opposite ends thereof which are connected at their other ends to separate ports of the valve 97 and it will be noted that the valve 97 has the partially rotatable core 97*a* therein having curved passageways 400 and 401 therein.

Now, by moving the free end of the control lever 107 rearwardly, the core 97*a* is positioned as shown in Figure 7 so that hydraulic fluid will flow from the pump 61 through pipe 72, manifold 74, pipe 77 and the passageway 400 in valve 97, through pipe 396 to the right-hand end of the cylinder 391 to thus move the piston rod outwardly and to move the movable arm 376 away from the arm 377. Fluid will return through the pipe 397, through the passageway 401 in valve 97, through the pipe 87, manifold 75, and finally through the pipe 73 to be discharged into the expansion tank 60.

When it is desired to move the squeeze arm 376 toward the fixed arm 377 for squeezing or clamping an object therebetween, the lever 107 is moved forwardly to thus turn the core 97*a* ninety degrees to the position shown in Figure 7. Fluid under pressure will then flow to the pipe 77 in the manner heretofore described and then through the passageway 400 in the valve 97 and through the pipe 397 to the left-hand end of the cylinder 391 to thus move the piston rod from left to right in Figures 1, 3 and 7, and to move the arm 376 correspondingly. The fluid, of course, will return through the pipe 396 and the passageway 401 in valve 97 and through pipe 87 to the manifold 75 and thus through the pipe 73 to be discharged into the expansion tank 60.

Figure 9:
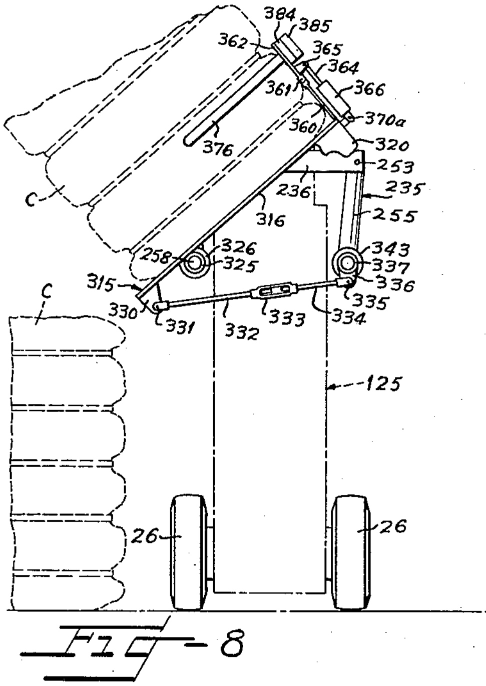
Figure 9 is a view similar to Figure 8 but showing the improved platform in its lowest position.
Figure 8:
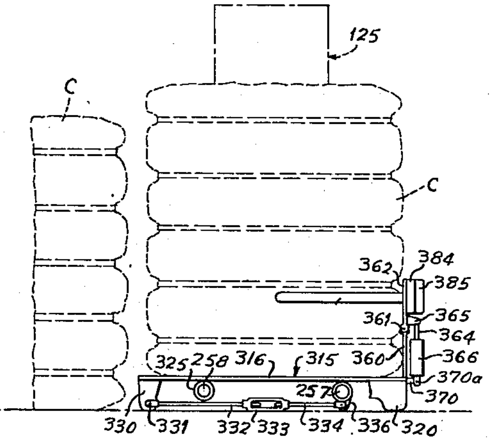
Figure 8 is a schematic elevation, on a reduced scale, similar to Figure 5 but showing the improved carriage platform in a different position.

Referring to Figures 5, 8 and 9 there may be observed tiered bales of cotton C which are representative of the many objects which may be handled with this apparatus and these tiered bales of cotton C are usually arranged in warehouses and the like in closely spaced parallel rows, the bales of cotton C in an adjacent row being shown in Figure 5 only.

It is a well known fact that objects stored in warehouses and particularly bales of cotton, are owned by many separate and distinct parties and in many instances there are many various qualities or grades of cotton or the like which may be in bales immediately adjacent each other.

Heretofore, in order to remove a particular article from the middle of any given row of articles, for instance, it has been necessary to space these rows sufficiently apart from each other to permit industrial trucks, such as that shown in Figure 1 without the improved carriage 315 thereon, to be turned crosswise of the aisle formed by the rows of tiered articles. This, of course, caused a considerable waste of valuable storage space due to larger aisles, and this also saves considerable wear on the truck and saves time in manipulation of the truck. In the present invention, and as is clearly shown in Figures 5, 8 and 9, the space between adjacent rows of tiered articles or objects need only be slightly larger than that of the width of the truck or sufficient for the width of the improved carriage platform 315 to pass therebetween.

When the industrial truck 20 has been moved to a position adjacent the desired bale of cotton or the like, it is merely necessary for the operator to move the free end of the control lever 109 forwardly to thus direct fluid under pressure to the upper ends of the cylinders 263 and 264 in the manner heretofore described, which, of course, will result in the piston rods 276 and 295, respectively, moving the squeeze arms 257 and 258 away from each other. This will cause the platform 315 to be tilted as shown in Figure 5 due to the fact that the tubular member 325 is oscillatably mounted on the arm 258 while the tubular member 337 is fixed on the squeeze arm 257 and thus the squeeze arm 257 will move the right-hand end of the connecting rod 334 to the right thus moving the plate 316 in a counter-clockwise direction as the arms 257 and 258 move apart from each other.

The squeeze arms 376 and 377 on the hinged plate 362 will straddle the desired bale of cotton and then fluid under pressure will be admitted to the left-hand end of the cylinder 391 in Figure 1 thus causing the squeeze arm 376 to engage the bale of cotton and squeeze the bale of cotton between the arms 376 and 377. After this, fluid under pressure may be admitted to the lower ends of the cylinders 263 and 264, in the manner heretofore described, by moving the control lever 109 rearwardly to thus cause the squeeze arms 257 and 258 to be moved inwardly towards each other until they assume the position shown in Figure 4.

Figure 8 shows the platform 315 in the position that it will assume when the squeeze arms 257 and 258 are moved inwardly towards each other a relatively short distance from the position shown in Figure 5 and Figure 9 shows the position of the platform 315 when the squeeze arms 257 and 258 have been moved to their innermost position. It is seen that upon the upper bale of cotton being moved inwardly as shown in Figure 5 and finally to a vertical position similar to that shown in Figure 9, the control levers 110 and 111 may be moved rearwardly to a vertical position, successively, to thus lower the platform 315 to the position shown in Figure 9 after which the lever 107 may be moved forwardly to move the squeeze arms out of engagement with the bale of cotton and then the lever 108 may be moved forwardly at its upper free end to tilt the hinged plate 362 and its associated arms 376 and 377 out of the way of the bale of cotton C so that another operator may pull the bale of cotton C onto a suitable hand truck or the like. It is obvious that the apparatus may be used in removing the lower bale of cotton shown at the left-hand side of Figures 5, 8 and 9 in a like manner to that in which the upper bale of cotton is removed.

*Modified form of the invention*

Referring to Figures 10 to 15, inclusive, there is shown a modified form of carriage platform broadly designated at 415. This modified carriage platform 415 is very similar to the original form of platform 315 and many of the parts are identical and therefore the same reference characters will apply and where modified parts are used, a concise explanation will be given to define which part is replaced by the modified parts.

In the modified form of the invention, the tubular member 325 which is welded to the lower surface of the plate 316 and the tubular member 337 which supports the free end of the plate 316 when in a lowered or level position, are very similar to these same members 325 and 337 associated with the original form of the platform 315, with the exception that the rear ends of the pipes 325 and 337 do not extend rearwardly beyond the rear edge of the plate 316 (Figure 15). The platform 415 is particularly adapted for use with truck lifts having the lift arms 216 and 217 mounted on the rod 205 associated with the rectangular frame 185 and which are used in lieu of the frame 335 and its associated squeeze arms 257 and 258. The dog clutch member 343 is also omitted from the rear end of the pipe 337 and the annular portion 326 is also omitted from the end of the pipe 325 in the modified form of the invention.

Referring to Figure 10 it may be observed that the pipe 337 of the platform 415 is provided with horizontally disposed plates 416 which are spaced apart from each other and extend longitudinally of the pipe 337 and extend at their rear ends beyond the rear end of the pipe 337. The horizontal portion 220 of the lift arm 216 is adapted to slide into the space between the horizontal plates 416 and a headed pin 420 slidably penetrates the plates 416 as well as the arm 220 to thus lock the pipe 337 in position on the arm 220.

Referring to Figure 15 it may be observed that the tubular member 325 of the modified platform 415 is welded or otherwise secured to the lower surface of the plate 316 and terminates a substantial distance from the front and rear edges of the plate 316 and is slidably penetrated by a tubular member 422 which extends a substantial distance beyond the opposite ends of the tubular member 325. The rearmost end of this tubular member 422 terminates substantially in a vertical plane with the rear edge of the plate 316. To prevent endwise movement of the tubular member 422 within the tubular member 325, suitable annular members 423 and 424 are mounted on the projecting ends of the tubular member 422 as by a sweat fit and it is thus seen that the tubular member 325 may oscillate on the tubular member 422 when the plate 316 of the platform 415 is tilted in a manner to be later described.

Extending longitudinally of the tubular member 422 and also beyond the rear end of the same in Figure 15 is a pair of spaced plates 426 between which the portion 221 of the lift arm 217 is adapted to be slidably inserted. A suitable headed pin 427 slidably penetrates the exposed rear ends of the plates 426 as well as the arm 221 to thus prevent the tubular member 422 as well as the tubular member 325 and its associated plate 316 from sliding off the horizontal portion 221 of the lift arm 217 unintentionally.

Inasmuch as the arms 217 and 216 do not move apart from each other in the same manner that the squeeze arms 257 and 258 move apart from each other, but remain in a fixed vertical position, the tie rods 332 and 334 along with the turn buckle 333 of the original platform 315 are omitted from the modified platform 415 and are replaced by a double acting cylinder 430 having a piston 431 mounted therein for longitudinal sliding movement and to which a piston rod 432 is connected. The double acting cylinder 430 and its associated piston 431 are identical to the cylinder 263 (Figure 16) and its associated piston 275 and a further description thereof is deemed unnecessary. Also, in view of the fact that the cylinders 263 and 264 are not employed in the modified form of the invention shown in Figure 10, the flexible pipes 270 and 271 in Figure 7 are directed as shown in dotted lines to opposite ends of the cylinder 430.

The right-hand end of the cylinder 430 in Figure 10 has outwardly extending ears 435 integral therewith which are pivotally connected as at 436 to the plate 336 extending downwardly from the tubular member 337. The piston rod 432 is pivotally connected at its free end as at 437 to the lower end of the plate 330 which depends from the lower surface of the horizontally disposed plate 316.

Figure 13:
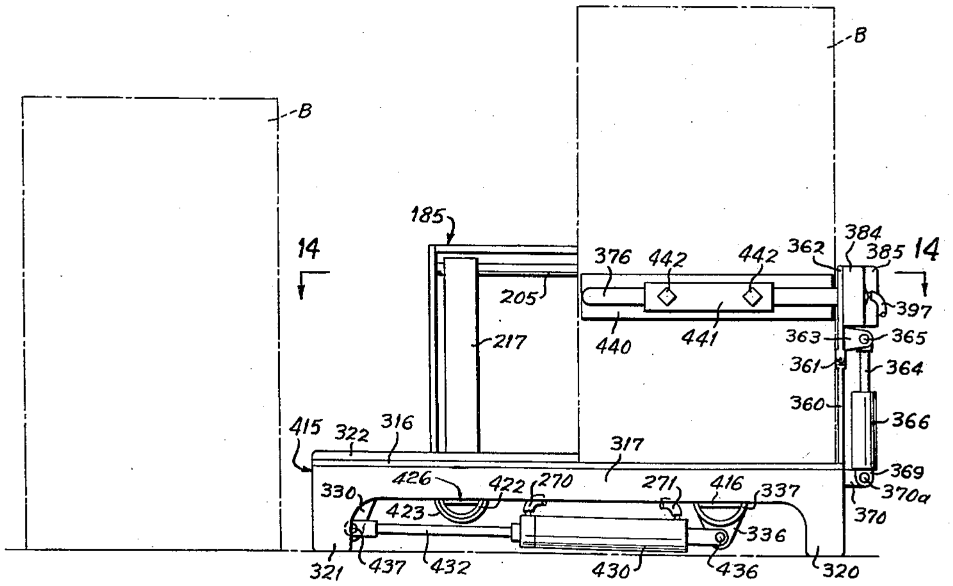
Figure 13 is a view similar to Figure 12, but showing the improved platform in a lowered or subsequent position ready for removal of the drum from the improved carriage platform.

By referring to Figures 11, 12 and 13, it may be observed how the attitude of the platform 415 may be changed from horizontal to vertical or vice versa due to the fact that the platform 415 oscillates about the tubular member 422 on the arm 221 while the pipe 337 remains in a fixed position on the horizontal portion 220 of the lift arm 216. In order to move the platform 415 about its axis, say from the position shown in Figures 10 and 13 to that shown in Figure 11, the lever 109 (Figure 2) is moved in such a manner as to cause fluid under pressure to flow from the pipe 79 (Figure 7) through the passageway 304 in valve 99 and through the pipe 270 to the left-hand end of the piston 430, thus causing the piston rod 432 to move from left to right in Figure 10 through the position shown in Figure 12 and to the position shown in Figure 11. It is manifest that by moving the lever 109 in the opposite direction, fluid will be directed to the right-hand end of the cylinder 430 to thus move the piston rod from the position shown in Figure 11 to that shown in Figure 10, thus moving the platform 415 from a vertical to a horizontal position.

Figure 14:
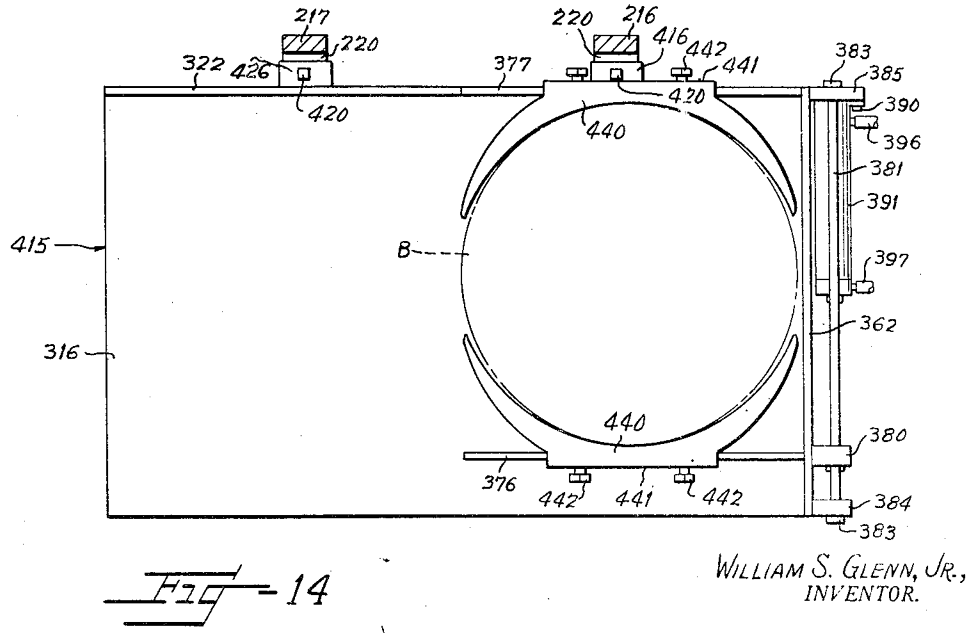
Figure 14 is a top plan view of the structure shown in Figure 13, but showing the lift arms in cross section and being taken substantially along the line 14—14 in Figure 13.

Referring to Figure 14 it may be observed that the arms 376 and 377 are each provided with a removable curved member 440 both of which are identical. These curved members 440 have elongated flattened portions 441 integral therewith which are adapted to be slidably penetrated by the arms 376 and 377 and the members 440 are locked on the arms 376 as by set screws 442. It is thus seen that these arcuate or curved members may be easily removed from the squeeze arms 376 and 377, when desired, and the purpose of these curved members 440 is to provide for the handling of circular objects such as rolls of cloth, tar paper or the like, or cylindrical containers, such as oil drums.

Although the curved members 440 are shown associated with the modified platform 415 only, it is obvious that these arms 440 may also be used equally as well with the original form of the platform 315. As seen in Figure 14, the curved members 440 curve inwardly towards each other when they are mounted on the squeeze arms 376 and 377 and thus the cylindrical article which is to be handled, and which is indicated at B in Figures 11, 12, 13 and 14, may be placed on the platform 415 while the plate 362 is in a position perpendicular to the plate 360 and then the plate 362 may be moved into alinement with the plate 360, in the manner heretofore described, to thus position the members 440 forwardly and rearwardly of the article B.

The squeeze arm 376 may then be moved rearwardly towards the arm 377 to thus grasp the article B between the members 440 and then the hinged plate 362 may be turned at right-angles to the plate 360 to the position shown in Figures 11 and 12. Then the article B may be placed atop a similar article B substantially as shown in Figures 12 and 11.

It is thus seen that I have provided a tiltable platform for industrial trucks which will handle articles that are of cubical, cylindrical or irregular shape and which will facilitate lifting the articles and positioning them to one side of the normal path of travel of the industrial truck. And it is seen that the articles may be positioned to one side of the truck in the same attitude that they were placed on the platform or they may be turned on one side as desired.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In combination with a lift truck having a main frame and a vertical upright and a lift element movable along the upright, a tiltable platform adapted to carry articles to be tiered, said tiltable platform having pivotal connection with the lift element in off center relation to the longitudinal axis of the lift truck, a hydraulic cylinder disposed beneath the platform and being pivotally connected to the lift element at one end thereof, a piston in the hydraulic cylinder, a piston rod connected to the piston and extending from the cylinder and passing below the said pivotal connection and being pivotally connected to the bottom of the platform at a point beyond the first-named pivotal connection relative to the point at which the cylinder is connected to the lift element, a source of fluid under pressure and means for alternately admitting fluid to opposite ends of the cylinder, whereby upon fluid being admitted to the end of the cylinder from which the piston rod projects, the piston rod will be drawn into the cylinder, thus pulling the opposite end of the platform towards the same, resulting in the platform turning on its pivotal connection, and in its end nearest the cylinder being moved upwardly to thus tilt the platform at an angle transverse to the normal path of travel of the lift truck and whereby, upon fluid under pressure being admitted to the other end of the cylinder, the platform may be lowered to its original horizontal position.

2. In an automotive lift truck having a chassis and a source of fluid under pressure carried by the chassis and also having an upstanding frame mounted on the front end of the chassis, a substantially rectangular frame mounted for vertical movement on the upstanding frame, a first and a second swingable arm pivoted on the rectangular frame, the axes of the said pivots for the arms being parallel to the longitudinal axis of the truck, said swingable arms having forwardly projecting portions integral therewith, a platform oscillatably mounted on the projecting portion of the first arm and being adapted to rest on the projecting portion of the second arm during a lifting or lowering operation of the rectangular frame, a plate depending from the platform adjacent the first swingable arm but being on the far side of the first swingable arm relative to the second swingable arm, a plate fixed to and depending from the projecting portion of the second swingable arm, a connecting rod pivotally connected at opposite ends thereof to the depending plates, manually controlled hydraulic means for swinging the swingable arms apart from each other to cause the platform to be tilted as it is partially rotated about the projecting portion of the first swingable arm.

3. The combination, with a truck, of a substantially vertical extensible frame carried by the truck, a carriage mounted for vertical movement along the extensible frame, a pair of spaced arms projecting forwardly from the carriage, a platform pivotally mounted on the front of the carriage for rotary movement thereon about a substantially horizontal axis, the said horizontal axis being disposed to one side of the longitudinal axis of the truck, the said platform comprising a plate, a tubular member welded to the lower surface of the plate adjacent one side thereof, a second tubular member, means for removably connecting the second tubular member to the lower surface of the said plate and in spaced relation to the first of the tubular members, and said spaced arms on the vertically movable carriage being adapted to slide into the tubular members on the platform, whereby the platform may be pivoted on one of the forwardly projecting arms when released from the other of the tubular members, and hydraulic means for tilting the platform on the tubular member secured thereto, thus tilting the platform upwardly away from the other of the tubular members.

4. In an automotive industrial truck having a forwardly and rearwardly tiltable vertical frame at its front end, and a second frame mounted for vertical movement on the vertical frame, an auxiliary frame adapted to be mounted on the second frame, a pair of swingable squeeze arms pivotally connected to the auxiliary frame and extending forwardly therefrom, said squeeze arms being pivoted on axes above, at opposite sides of, and parallel to the longitudinal axis of the truck, hydraulic means for swinging the squeeze arms inwardly and outwardly with respect to each other, a load carrying platform adapted to be supported on the swingable arms, one end of said platform being adapted to oscillate on one of the swingable arms, said platform having a depending member thereon adjacent the pivoted end of the platform and remote from the other of the swingable arms and a connecting rod connected to the depending member at one end thereof and being connected at its other end to the swingable arm disposed remotely from the depending member whereby, upon the hydraulic means moving the swingable squeeze arms apart from each other, the connecting rod will cause the platform to tilt about the squeeze arm on which it is pivoted, thus changing the attitude of the platform for depositing the load thereon to one side of the normal path of travel of the industrial truck.

5. In an automotive industrial truck having a forwardly and rearwardly tiltable vertical frame at its front end, and a second frame mounted for vertical movement on the vertical frame, an auxiliary frame adapted to be mounted on the second frame, a pair of swingable squeeze arms pivotally connected to the auxiliary frame and extending forwardly therefrom, said squeeze arms being pivoted on axes above, at opposite sides of, and parallel to the longitudinal axis of the truck, hydraulic means for swinging the squeeze arms inwardly and outwardly with respect to each other, a load carrying platform adapted to be supported on the swingable arms, one end of said platform being adapted to oscillate on one of the swingable arms, said platform having a depending member thereon adjacent the pivoted end of the platform and remote from the other of the swingable arms and a connecting rod connected to the depending member at one end thereof and being connected at its other end to the swingable arm disposed remotely from the depending member whereby, upon the hydraulic means moving the swingable squeeze arms apart from each other, the connecting rod will cause the platform to tilt about the squeeze arm on which it is pivoted, thus changing the attitude of the platform for depositing the load thereon to one side of the normal path of travel of the industrial truck, a plate secured to the end of the platform remote from its pivot point and projecting upwardly therefrom when the platform is in a horizontal position, a second plate hingedly connected to the upper edge of the first-named plate, a pair of squeeze arms on the hinged plate and normally extending in parallel relation to the platform and transverse to the longitudinal axis of the truck, hydraulic means for tilting the hinged plate and its associated squeeze arms at an angle relative to the first-named plate, other hydraulic means for controlling at least one of the said squeeze arms on the hinged plate for moving the same forwardly and rearwardly with respect to the other.

6. In an industrial truck, in combination with the front portion of the frame thereof and a substantially vertical frame assembly supported by the said portion of the frame, a substantially rectangular frame mounted for vertical movement on the vertical frame, a platform pivoted on one side of the rectangular frame on an axis parallel to the longitudinal axis of the truck but in off center relation thereto, hydraulic means connected to the platform at one end thereof and connected to the frame at the other end thereof for tilting said platform from horizontal to vertical position and vice versa, a plate hingedly connected to the end of the platform remote from its pivot point, a pair of arms projecting from said hinged plate, one of said arms being fixed to the plate and the other of said arms being movable on said plate, hydraulic means connected to said hinged plate for controlling the attitude of said hinged plate with respect to the platform, hydraulic means connected to the said movable arm for controlling its position relative to the other of the arms, whereby the hinged plate with its arms may be moved out of the way for loading the platform when the platform is in a lowered position and then the hinged plate with its arms may be moved to a position where the arms will straddle the load on the platform for clampingly engaging the load and holding the same on the platform as the platform is raised and then tilted, and then the movable arm may be moved away from the fixed arm to release the load and thus permit the load to be deposited to one side of the normal path of travel of the truck.

7. In a structure according to claim 6, a pair of curved members adapted to be slidably mounted on the arms associated with the hinged plate, the said curved members being concave on their proximate sides when mounted on the said arms, whereby a cylindrical article may be placed on the platform and the arms may straddle the cylindrical article and grasp the same as the platform is raised and then tilted for placing the cylindrical article in a position to one side of the path of travel of the lift truck.

8. In an industrial truck having a chassis and a vertical frame connected to the front end of the chassis and also having a pair of lift arms projecting forwardly therefrom and being vertically movable on the said vertical frame, a platform comprising a substantially rectangular plate, a tubular member secured to the lower surface of said plate and extending parallel to and spaced from one of the side edges of said plate, a second tubular member disposed in spaced parallel relation to the other of the tubular members and loosely engaging the lower surface of said plate, a third tubular member mounted within the first tubular member to permit oscillation of the first tubular member thereon, a hydraulic cylinder connected to the second of the tubular members, a piston in the hydraulic cylinder and a piston rod connected to the piston and extending out of the hydraulic cylinder, the free end of said piston rod being connected to the rectangular plate at a point beyond the first of the tubular members, relative to the second tubular member, a source of fluid under pressure to opposite ends of said cylinder alternately and said second and third tubular members being adapted to be fixedly mounted on the lift arms, whereby upon the fluid under pressure being admitted to the end of the cylinder nearest the first tubular member, the platform will tilt about the third tubular member and upon the fluid under pressure being admitted to the other end of the hydraulic cylinder, the platform may be returned to its original position.

9. In combination, a lift truck having a vertically movable frame thereon and a pair of laterally spaced lift arms projecting forwardly from the vertically movable frame and also having a carriage platform supported by the lift arms and also having means for tilting the carriage platform about the axis of one of the lift arms whereby an article may be placed on the platform while in its horizontal position and then moved upwardly and then slid off the platform to be deposited to one side of the normal path of travel of the lift truck, and spaced means carried by the platform and being movable towards and away from each other for engaging and applying pressure to opposed sides of an article resting on the platform.

10. In an industrial truck having a vertically movable frame and first and second spaced members disposed in a substantially horizontal plane and having their axes disposed substantially parallel to each other and parallel to the longitudinal axis of the truck, a platform pivoted near the first end thereof to one of the spaced members and being adapted to rest near its second end on the other spaced member, said platform having a downwardly projecting portion disposed between the outer end thereof and the first spaced member, the second spaced member also having a downwardly projecting portion, a connecting rod extending between the two downwardly projecting portions, means for moving the two spaced members towards and away from each other to thereby tilt the platform on the first spaced member to raise its free end relative to the second spaced member.

11. In an industrial truck having a vertically movable frame and a pair of spaced members disposed in a substantially horizontal plane and having their axes disposed parallel to each other and parallel to the longitudinal axis of the truck, a platform pivoted near one end thereof to one of the spaced members and being adapted to rest near its other end on the other spaced member, said platform having a downwardly projecting portion near the end thereof which is pivotally mounted on one of the spaced members, the other of the spaced members having a downwardly projecting portion, a connecting rod extending between the two downwardly projecting portions, means for moving the two spaced members towards and away from each other to thereby tilt the platform on the first of said spaced members to raise its free end relative to the second spaced member, said platform having a pair of spaced squeezing members disposed a substantial distance above the platform and adapted to occupy a position on opposed sides of an object resting on the platform, and means for moving the squeezing members towards and away from each other to grip opposed sides of the object to prevent its sliding off the platform when the platform occupies a tilted or vertical position.

12. In an industrial truck having a vertically movable frame on one end thereof and having first and second spaced members disposed in substantially the same horizontal plane and having their axes disposed in parallel relation to each other and to the longitudinal axis of the truck, a platform pivoted adjacent one of its ends on the first spaced member and being adapted near its other end to rest on the upper surface of the second spaced member, the platform having a downwardly projecting porton disposed between the outer end thereof and the first spaced member, the second spaced member having a downwardly projecting portion, hydraulic connecting means disposed between the two downwardly projecting portions and being operable to shorten or lengthen the overall length of the connecting means to thereby tilt the platform on the first spaced member and to move the other end of the platform away from towards the second spaced member.

13. In an industrial truck having a vertically movable frame on one end thereof and having first and second spaced members disposed in substantially the same horizontal plane and having their axes disposed in parallel relation to each other and to the longitudinal axis of the truck, a platform pivoted adjacent one of its ends on the first spaced member and being adapted near its other end to rest on the upper surface of the second spaced member, the platform at the end adjacent the first spaced member having a downwardly projecting portion and the second spaced member having a downwardly projecting portion, hydraulic connecting means disposed between the two downwardly projecting portions and being operable to shorten or lengthen the overall length of the connecting means to thereby tilt the platform on the first spaced member and to move the other end of the platform away from and towards the other spaced member, said platform having an uprising member provided with a pair of spaced arms, said uprising member having means for moving the spaced arms onto opposed sides of an object resting on the platform, and said uprising member having other means for moving the spaced arms towards and away from each other to grip opposed sides of an article resting on the platform to prevent its sliding off the platform when the platform is disposed in angular or vertical position.

WILLIAM S. GLENN, Jr.

REFERENCES CITED

The following references are of record in the file of this patent:

UNITED STATES PATENTS

| Number | Name | Date |
|---|---|---|
| 493,542 | Bessing et al. | Mar. 14, 1893 |
| 1,776,414 | Carlson | Sept. 23, 1930 |
| 1,786,884 | Allan | Dec. 30, 1930 |
| 1,878,994 | Abbe | Sept. 27, 1932 |
| 2,212,711 | MacIsaac | Aug. 27, 1940 |
| 2,234,599 | Johnston | Mar. 11, 1941 |
| 2,427,301 | Puim | Sept. 9, 1947 |
| 2,457,366 | Guerin | Dec. 28, 1948 |
| 2,475,367 | Avery | July 5, 1949 |
| 2,482,692 | Quales et al. | Sept. 20, 1949 |
| 2,516,686 | Druschel | July 25, 1950 |